United States Patent
Asai

(10) Patent No.: US 6,373,582 B1
(45) Date of Patent: Apr. 16, 2002

(54) MULTI-FUNCTION PERIPHERAL DEVICE

(75) Inventor: Kazunobu Asai, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 08/936,684

(22) Filed: Sep. 24, 1997

(30) Foreign Application Priority Data

Sep. 25, 1996 (JP) .............................................. 8-252574

(51) Int. Cl.[7] .............................................. G06F 15/00
(52) U.S. Cl. ...................... 358/1.13; 358/1.15; 358/437
(58) Field of Search ................. 358/410, 412, 358/442, 468, 437, 438, 1.13–1.15, 444, 1.1, 434; 395/114

(56) References Cited

U.S. PATENT DOCUMENTS 5,726,769 A * 3/1998 Imai et al. ................... 358/442
5,815,280 A * 9/1998 Ohmura et al. ............. 358/296
RE36,211 E * 5/1999 Nonomura ................... 358/434
5,943,503 A * 8/1999 Kai ............................. 395/839

* cited by examiner

*Primary Examiner*—David Moore
*Assistant Examiner*—Douglas Tran
(74) *Attorney, Agent, or Firm*—Oliff & Berridge, PLC

(57) ABSTRACT

A multi-function peripheral device is capable of printing print data at high speed while in a print priority mode without disturbing the process of receiving and printing facsimile data. When print priority mode is selected or when no facsimile data is being received, a busy timer is set to, for example, 9 μs to shorten a High level output busy signal duration time. This shortens the time interval between print data inputs, which in turn increases the amount of input print data per unit time and allows print data to be printed at higher speeds. When print priority mode is not selected and facsimile data is being received, the busy timer is set to, for example, 400 μs to lengthen the High level output busy signal duration time. This lengthens the time interval between print data inputs, which in turn allows more time to execute the process of receiving and printing facsimile data. Accordingly, the reception and printing of facsimile data are carried out smoothly.

27 Claims, 6 Drawing Sheets

MULTI-FUNCTION PERIPHERAL DEVICE

BACKGROUND OF THE INVENTION

1. Field of Invention

The present invention relates to a multi-function peripheral device capable of printing both facsimile data sent from an external facsimile machine, and print data coming from a computer or a similar external device.

2. Description of Related Art

Multi-function peripheral devices for computers have been developed in recent years. These peripheral devices offer a plurality of functions.

One such device is a facsimile machine equipped with a printer function. The facsimile machine prints print data coming from a personal computer, a word processor or a similar device by utilizing its printing function that was originally designed to print facsimile data. The printer-function-equipped facsimile machine prints facsimile data received from another facsimile machine over a communication line, and prints print data received from an external device such as a personal computer.

The printer-function-equipped facsimile machine is connected to external devices, e.g., a personal computer, via a Centronics® interface. Print data from the external device is input to the facsimile machine, one byte at a time, through the Centronics® interface.

Specifically, print data is first admitted to an input register of the facsimile machine. With print data located in the input register, the facsimile machine executes interrupt handling (i.e., print data input interrupt handling) to retrieve the data from the input register, and to write the retrieved data to a print memory. When one page of print data has been written to the print memory, the facsimile machine, using its printer function, prints the page data onto recording paper.

During print data input from the external device, the facsimile machine executes interrupt handling to write the incoming print data to the print memory very frequently, e.g., every time one byte of print data is received. Thus, if print data is received while facsimile data is being received, the facsimile machine has difficulty expediting the process of receiving and printing the facsimile data, i.e., the process of decoding the received facsimile data into bit images and printing the bit images. As a result, the facsimile machine may take a considerable amount of time to print the received facsimile data.

One conventional solution to this problem is to establish a long time interval between print data inputs to allow for the reception and printing of facsimile data, thereby minimizing delays in the printing of facsimile data.

When print data is input to the facsimile machine during facsimile data print-out, the printer-function-equipped facsimile machine, i.e., a multi-function peripheral device, prints the received print data after it prints the facsimile data. Because printing of the facsimile data takes time, the printing of the received print data is delayed. This delay is an inconvenience to the user.

The printing bottleneck is bypassed conventionally by providing a print priority mode, in which print data is printed before the facsimile data is printed. The print priority mode is typically set by a user using a print priority key on a control panel of the facsimile machine.

However, as discussed above, the interval between print data inputs is set to be sufficiently long to expedite the process of receiving and printing facsimile data. Thus, it takes a relatively long time to input print data, even in print priority mode. Accordingly, the facsimile machine is unable to input print data at high speed, even in the print priority mode.

Also, in the print priority mode, the printing of facsimile data is suspended until printing of the print data has been completed.

SUMMARY OF THE INVENTION

It is an object of the present invention to overcome the above and other disadvantages of the related art and to provide a multi-function peripheral device, e.g., a printer function-equipped facsimile machine, capable of printing print data at high speed in a print priority mode without disturbing the process of receiving and printing facsimile data.

In carrying out the invention, and according to a first aspect thereof, there is provided a multi-function peripheral device having facsimile data reception means for receiving, via a communication line, facsimile data sent from an external facsimile machine or similar device, print data input means for inputting print data output by an external device, e.g., a computer, and recording means for printing both data received by the facsimile data reception means and data input through the print data input means onto recording paper. The multi-function peripheral device comprises: (1) mode judgment means for judging whether or not a print priority mode is selected, the print priority mode, when selected, allowing the recording means to print the data input through the print data input means before printing the data received by the facsimile data reception means; and (2) input interval setting means for setting, when the mode judgment means judges that the print priority mode is selected, a time interval between print data inputs received from the external device that is shorter than the time interval set when the print priority mode is not selected.

With the multi-function peripheral device according to the first aspect of the invention, the data sent from a facsimile machine or similar device is received by the facsimile data reception means. The data output from an external device, such as a computer, is input through the print data input means. The data thus received or input is printed on recording paper by the recording means. The input interval setting means sets the time interval between print data inputs sent from the external device. When the mode judgment means judges that the print priority mode is selected, the input interval setting means sets a time interval between the print data inputs that is shorter than the time interval set when the print priority mode is not selected.

In a first preferred embodiment, the multi-function peripheral device further comprises reception judgment means for judging whether the facsimile data reception means is receiving data. If the mode judgment means judges that the print priority mode is not selected, and if the reception judgment means judges that facsimile data is being received, the input interval setting means sets a time interval between print data inputs received from the external device that is longer than the time interval set when the print priority mode is selected.

In a second preferred embodiment, the input interval setting means in the multi-function peripheral device changes the time interval between print data inputs by adjusting an interval between busy signals output to the external device.

According to a second aspect of the invention, there is provided a multi-function peripheral device having facsimile data reception means for receiving, via a communication line, facsimile data sent from an external facsimile machine or similar device, print data input means for inputting print data output by an external device, such as a computer, and recording means for printing both data received by the facsimile data reception means and data input through the print data input means onto recording paper. The multi-function peripheral device comprises: (1) reception judgment means for judging whether the facsimile data reception means is receiving facsimile data; and (2) input interval setting means for setting, when the reception judgment means judges that facsimile data is being received, a time interval between print data inputs received from the external device that is longer than the time interval set when facsimile data is not received.

With the multi-function peripheral device according to the second aspect of the invention, the data sent from an external facsimile machine over a communication line is received by the facsimile data reception means while the data output by an external device, such as a computer, is input through the print data input means. The data thus received or input is printed onto recording paper by the recording means. The input interval setting means sets the time interval between print data inputs sent from the external device. When the reception judgment means judges that facsimile data is being received, the input interval setting means sets a time interval between the print data inputs that is longer than the time interval set when no facsimile data is received.

In a third preferred embodiment, the input interval setting means in the multi-function peripheral device, in accordance with the second aspect of the invention, sets a time interval between busy signals output to the external device, when facsimile data is being received, that is longer than the time interval set when no facsimile data is being received.

As outlined above, the multi-function peripheral device, according to the first aspect of the invention, sets a print data input time interval, when the print priority mode is selected, that is shorter than the print data input time interval set when the print priority mode is not selected. Thus, with the print priority mode in effect, the amount of input print data per unit time is increased. The rapid input of print data enhances the speed at which input print data is printed.

The first preferred embodiment of the multi-function peripheral device implements the first aspect of the invention. Specifically, when the print priority mode is not selected and facsimile data is being received, the peripheral device of the first preferred embodiment sets a print data input time interval that is longer than the print data input time interval set when the print priority mode is selected. This allows a longer time to execute the process of receiving and printing facsimile data. Thus, the reception and printing of facsimile data are carried out at high speed.

The second preferred embodiment of the multi-function peripheral device also implements the first aspect of the invention. Specifically, the second preferred embodiment changes the print data input time interval by adjusting the time interval between busy signals output to the external device. Such a simplified structure is sufficient to vary the print data input time interval.

The multi-function peripheral device according to the second aspect of the invention sets a print data input time interval, when facsimile data is being received, that is longer than the print data input time interval set when no facsimile data is being received. During facsimile data reception, the time to execute the process of receiving and printing facsimile data is made longer than when no facsimile data is received. This allows the facsimile data to be received and processed at a higher speed.

The third preferred embodiment of the multi-function peripheral device implements the second aspect of the invention. Specifically, during reception of facsimile data, the time interval between busy signals output to the external device is made longer than when no facsimile data is received. Thus, the print data input time interval is lengthened. Such a simplified structure is sufficient to boost the speed at which facsimile data is received and printed.

A storage medium stores a control program that includes instructions for use by the controller of the multi-function peripheral device to perform the control procedures described above. The control program can be stored in a memory of the multi-function peripheral device in advance, for example, by the manufacturer or retailer of the multi-function peripheral device. Alternatively, the control program can be provided separately from the multi-function peripheral device, for example, on a CD-ROM or other storage media that can be purchased separately by the user and subsequently stored (permanently or temporarily) to internal memory of the multi-function peripheral device. The program also can be provided to the user over a communications network such as, for example, the Internet (World Wide Web). Thus, the storage medium can be internal ROM or RAM (volatile or non-volatile) of the multi-function peripheral device, or a separate memory such as a CD-ROM, floppy disk, etc. The program can be added to the multi-function peripheral device internal memory as an upgrade.

These and other features and advantages of this invention are described in or are apparent from the following detailed description of the preferred embodiment.

BRIEF DESCRIPTION OF THE DRAWINGS

The preferred embodiments of the present invention will be described in detail, with reference to the following figures, wherein.

DETAILED DESCRIPTION OF PREFERRED EMBODIMENTS

A preferred embodiment of the present invention will now be described with reference to the accompanying drawings. The preferred embodiment described herein is a printer-function-equipped facsimile machine, which is one type of multi-function peripheral device. The printer-function-equipped facsimile machine is a facsimile machine supplemented with a printer function, i.e., a fax machine that doubles as a printer. The preferred embodiment is a multi-function peripheral device that prints two kinds of data: (1) facsimile data that has been received; and (2) print data input from a personal computer.

Figure 1:
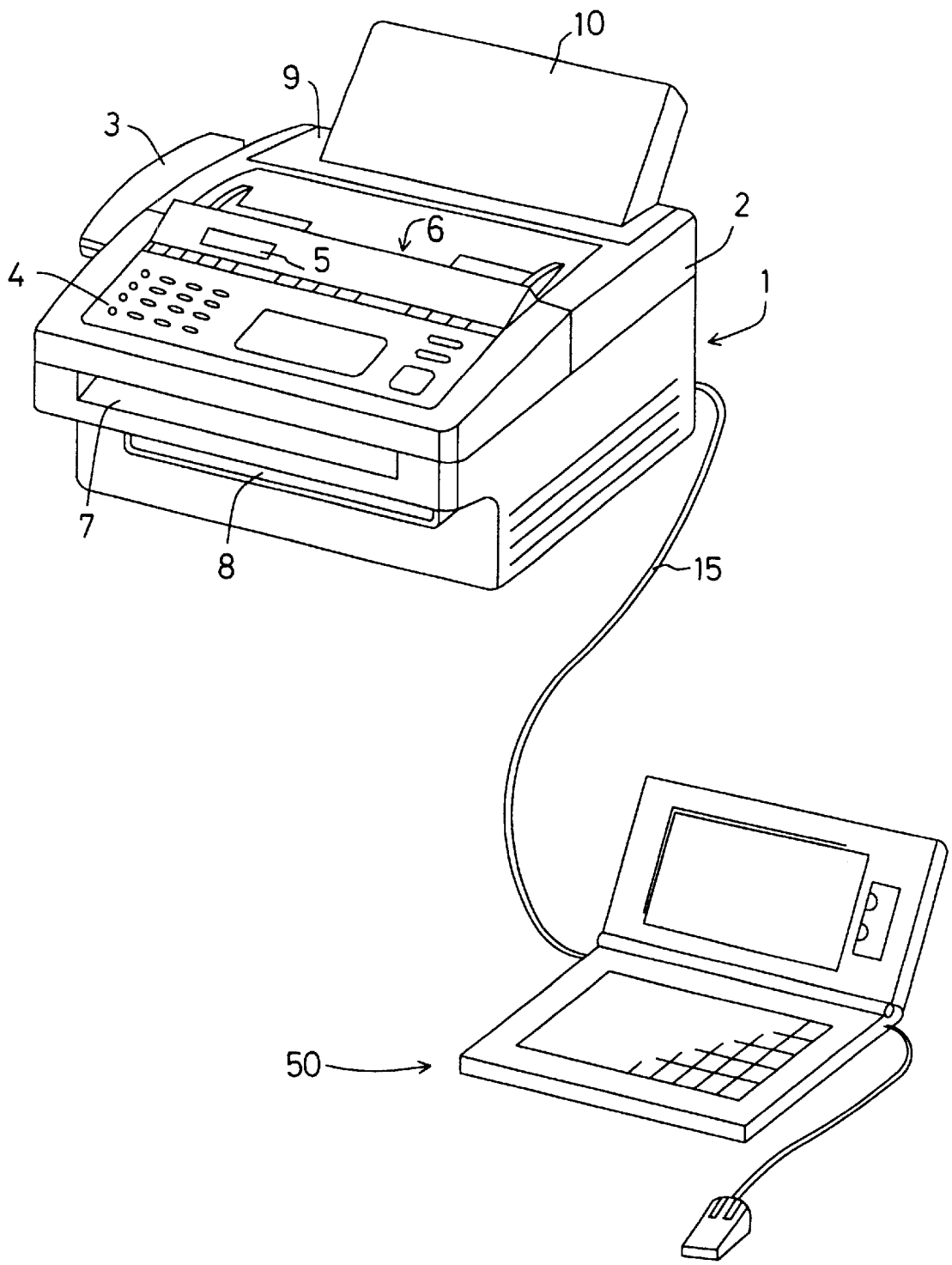
FIG. 1 is a perspective view of a printer-function-equipped facsimile machine employing the present invention.

FIG. 1 is a perspective view of a printer-function-equipped facsimile machine 1 connected to a personal computer 50. A handset 3 is attached to one side of a body 2 of the facsimile machine 1. When no call is being made, the handset 3 is cradled on a hook (not shown) mounted on the body 2. This state is called an "on-hook" state. When a call is being made, the handset 3 is lifted from the hook. This state is called an "off-hook" state. At the top front part of the body 2 is a control panel 4 that contains a plurality of keys, including a print priority key. In the upper left corner of the control panel 4 is a liquid crystal display (LCD) 5. The facsimile machine 1 is operated by pushing keys on the control panel 4. The current state or operations procedure is displayed on the LCD 5.

When a user pushes the print priority key on the control panel 4, the facsimile machine 1 enters print priority mode. The print priority mode causes the facsimile machine 1 to print input print data from the personal computer 50 before printing any facsimile data that may be received. This mode can be used when print data needs to be printed immediately, even as already received facsimile data is being printed. The print priority mode may also be utilized to ensure that print data is printed on a particular type of recording paper, e.g., an overhead projector sheet, supplied to the facsimile machine 1 specifically for the print data in question, even if facsimile data is later received.

Behind the control panel 4 and the LCD 5 is a document feed inlet 6. Documents to be faxed are inserted face down into the document feed inlet 6. Transmitted documents are ejected from a document outlet 7 located in the front part of the body 2 under the control panel 4. A recording paper tray mount 9 is furnished behind the document feed inlet 6. A recording paper tray 10, accommodating a stack of recording paper sheets, is removably attached to the recording paper tray mount 9. Sheets of paper fed from the recording paper tray 10 undergo a printing process and are ejected from a recording paper outlet 8 located under the document outlet 7.

Figure 2:
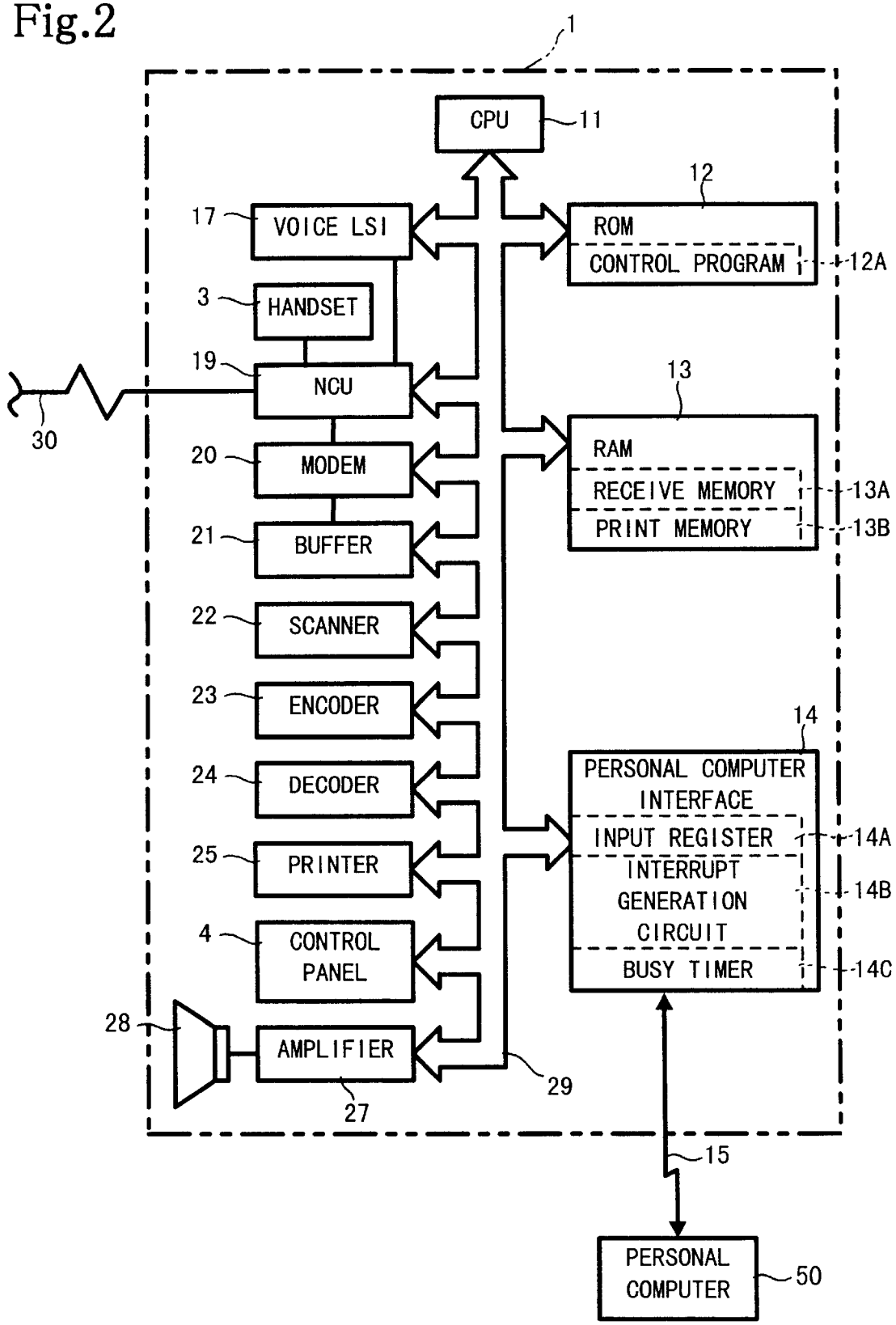
FIG. 2 is a block diagram of a control system used with the printer-function-equipped facsimile machine of FIG. 1.

The rear part of the body 2 is furnished with a connector for a personal computer interface 14, shown in FIG. 2. The facsimile machine 1 is connected to the personal computer 50, i.e., an external device, by means of a cable 15 connected to the personal computer interface 14. The cable 15, which connects the facsimile machine 1 to the personal computer 50, may be replaced by other suitable connecting means, such as, for example, an infrared signal optical connection link.

FIG. 2 shows a preferred control system used with the facsimile machine 1. The control system for the facsimile machine 1 comprises a CPU 11, a ROM 12, a RAM 13, the personal computer interface 14, a voice LSI 17, a network control unit (NCU) 19, a modem 20, a buffer 21, a scanner 22, an encoder 23, a decoder 24, a printer 25, the control panel 4, and an amplifier 27. These components are interconnected by a bus line 29.

On the basis of various signals transmitted and received via the NCU 19, the CPU 11 controls the appropriate components connected by the bus line 29 to carry out facsimile or printer operations. The ROM 12 is a read-only memory that stores programs, including a control program 12A executed by the facsimile machine 1. Programs for carrying out the control routines shown in the flowcharts of FIGS. 4–6 are stored in the ROM 12.

Figure 4:
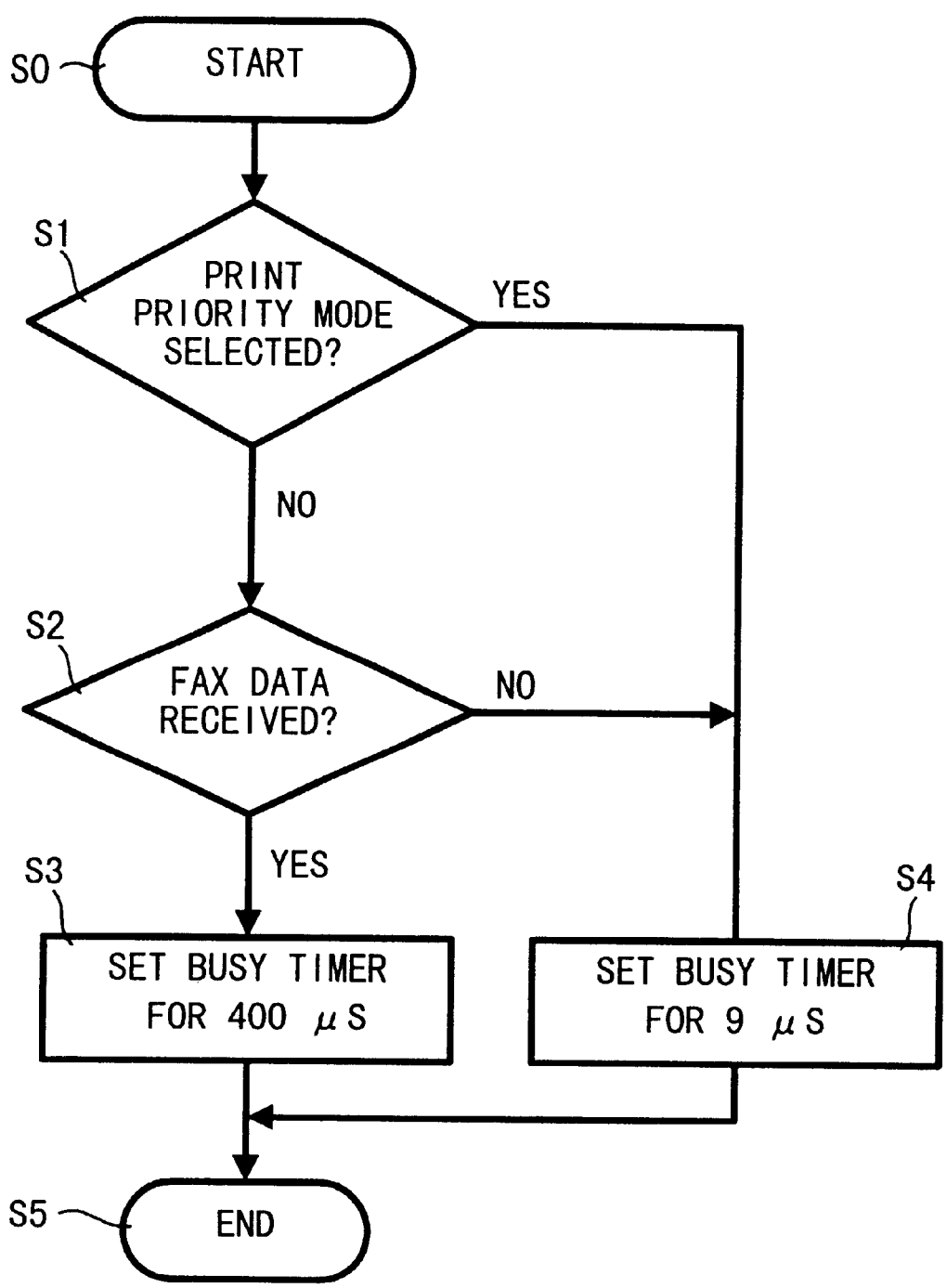
FIG. 4 is a flowchart of a preferred control routine for setting a busy timer.
Figure 5:
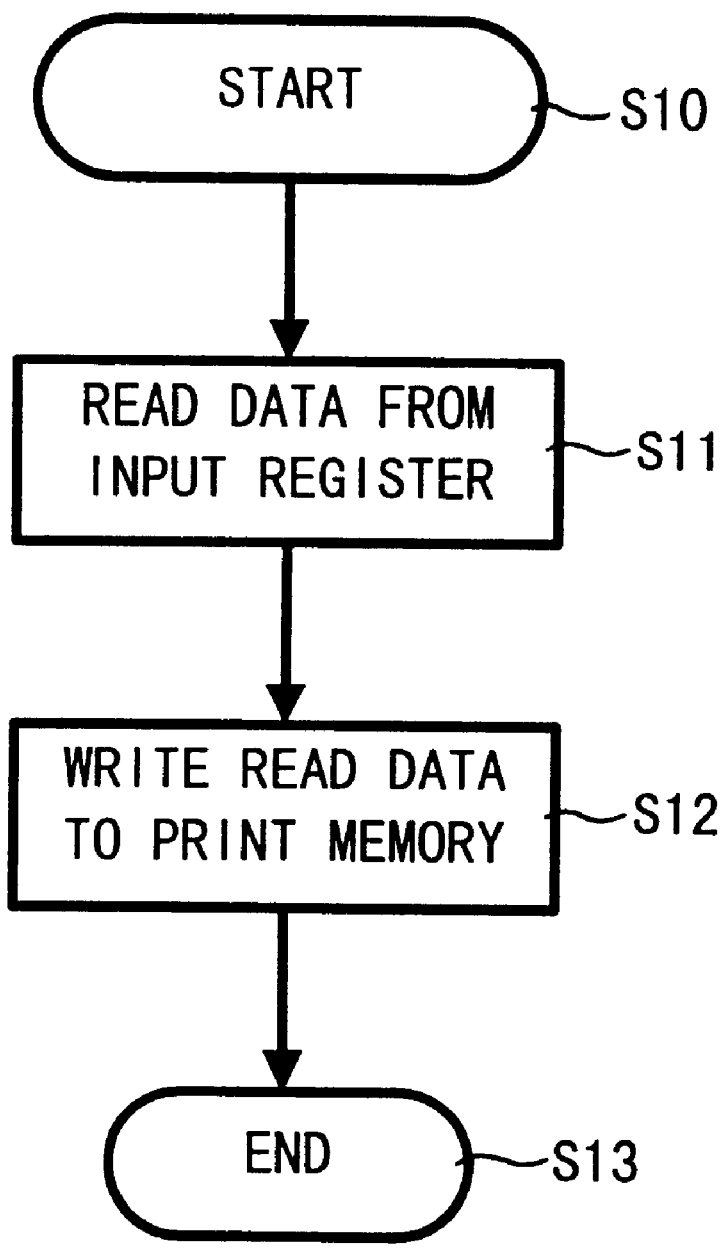
FIG. 5 is a flowchart of a preferred control routine for handling a print data input interrupt.
Figure 6:
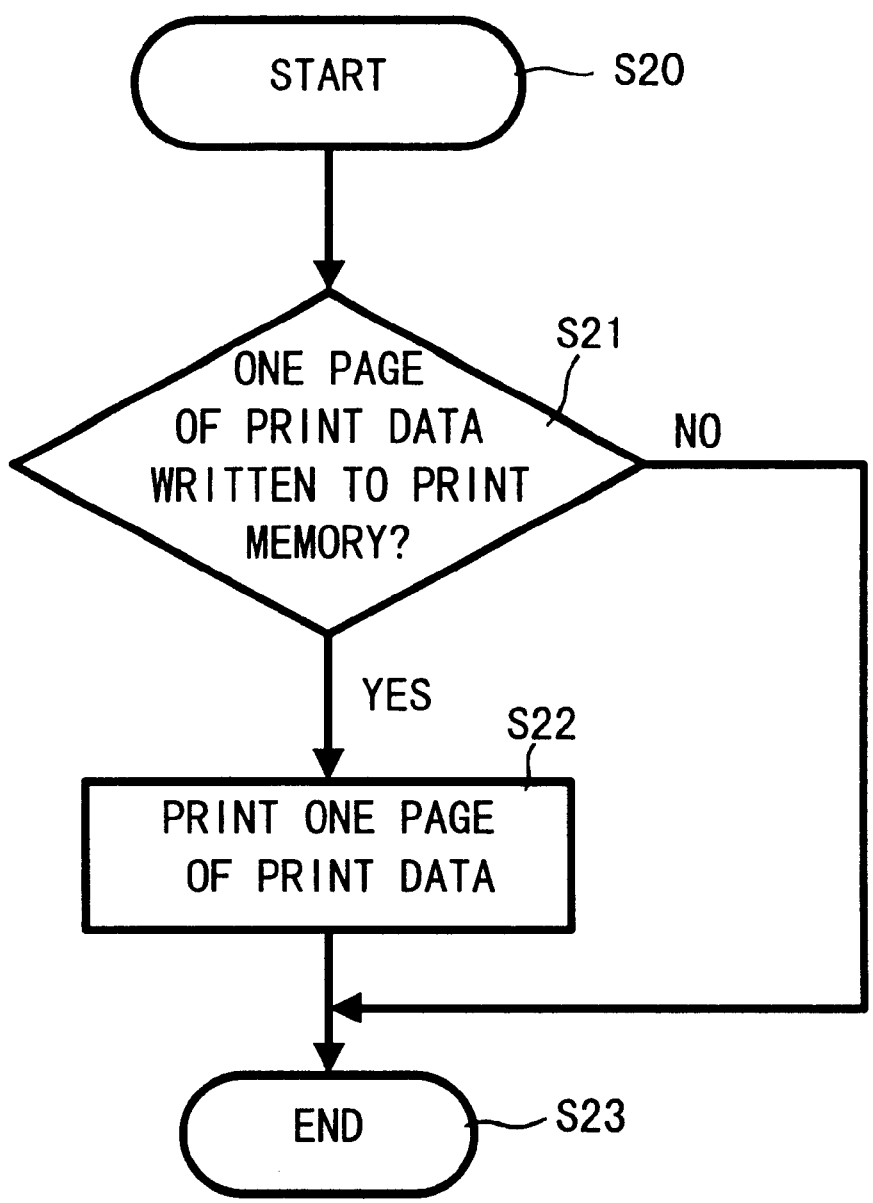
FIG. 6 is a flowchart of a preferred control routine for printing print data.

Accordingly, ROM 12 is a storage medium on which a control program is stored, the control program having instructions that cause the CPU 11 (the controller of the multi-function peripheral device) to perform the processes outlined in FIGS. 4–6. The control program can be stored in memory (e.g., ROM 12) in advance, for example, by the manufacturer or retailer of the multi-function peripheral device.

Alternatively, the control program can be provided separately from the peripheral device 1, for example, on CD-ROM or other storage media that can be purchased by the user and subsequently stored (permanently or temporarily) in internal memory of the peripheral device 1. The program also can be provided to the user over a communications network such as, for example, the Internet (World Wide Web). Thus, the storage medium can be internal ROM or RAM (volatile or non-volatile) of the peripheral device 1, or a separate memory such as a CD-ROM, floppy disk, etc.

The RAM 13 is intended to store various data and includes a receive memory 13A and a print memory 13B. The receive memory 13A stores facsimile data received from an external facsimile machine over a telephone line 30. The print memory 13B retains print data output by the personal computer 50, which is connected to the personal computer interface 14 via the cable 15. The facsimile data stored in the receive memory 13A and the print data held in the print memory 13B are printed by the printer 25 onto recording paper. After printing, the data are erased from the respective memories 13A and 13B.

The voice LSI 17 performs two functions: (1) it converts an analog voice signal received by the NCU 19 into a digital voice signal; and (2) it converts a digital voice signal generated within the facsimile machine 1 into an analog voice signal for output to the NCU 19. The modem 20 transmits and receives image data through modulation and demodulation, and exchanges various procedural signals with another facsimile machine (not shown) for transmission control. The buffer 21 temporarily stores encoded facsimile data to be exchanged with the other facsimile machine, as well as document image data read by the scanner 22.

The scanner 22 reads images from documents fed through the document feed inlet 6. The encoder 23 encodes document images read by the scanner 22. The decoder 24 reads received facsimile data from the buffer 21 and decodes the data. The data decoded by the decoder 24 is printed by the printer 25 onto recording paper. The control panel 4 allows the user to set or otherwise operate the facsimile machine 1. The amplifier 27 activates a speaker 28 connected thereto to effect a sound output. The facsimile machine 1 is connected to the telephone line 30 via the NCU 19.

The personal computer interface 14 is preferably a Centronics®-type interface comprising an input register 14A, an interrupt generation circuit 14B and a busy timer 14C. The input register 14A is preferably one byte in size. Print data coming from the personal computer 50 is received by the input register 14A one byte at a time. With print data in the input register 14A, the interrupt generation circuit 14B interrupts the CPU 11. When interrupted by the interrupt generation circuit 14B, the CPU 11 executes the print data input interrupt handling control routine shown in FIG. 5. During print data input interrupt handling, the CPU 11 reads the one byte of print of data from the input register 14A and writes the one byte of print data to the print memory 13B in the RAM 13.

The busy timer 14C controls a duration time during which a busy signal sent from the facsimile machine 1 to the personal computer 50 is held at a High level. No print data is output from the personal computer 50 as long as the busy signal remains High. Thus varying the High level duration time for the busy signal changes the time interval between print data inputs. The longer the High level duration period of the busy signal, the longer the time interval between print data inputs. The shorter the High level duration period of the busy signal, the shorter the print data input time interval. Carrying out the busy time setting control routine shown in FIG. 4 sets the busy timer 14C for a short High level duration time, preferably 9 $\mu$s, when print priority mode is in effect or when no facsimile data is received, and for a long High level duration time, preferably 400 $\mu$s, when print priority mode is not selected and facsimile data is being received.

Figure 3:
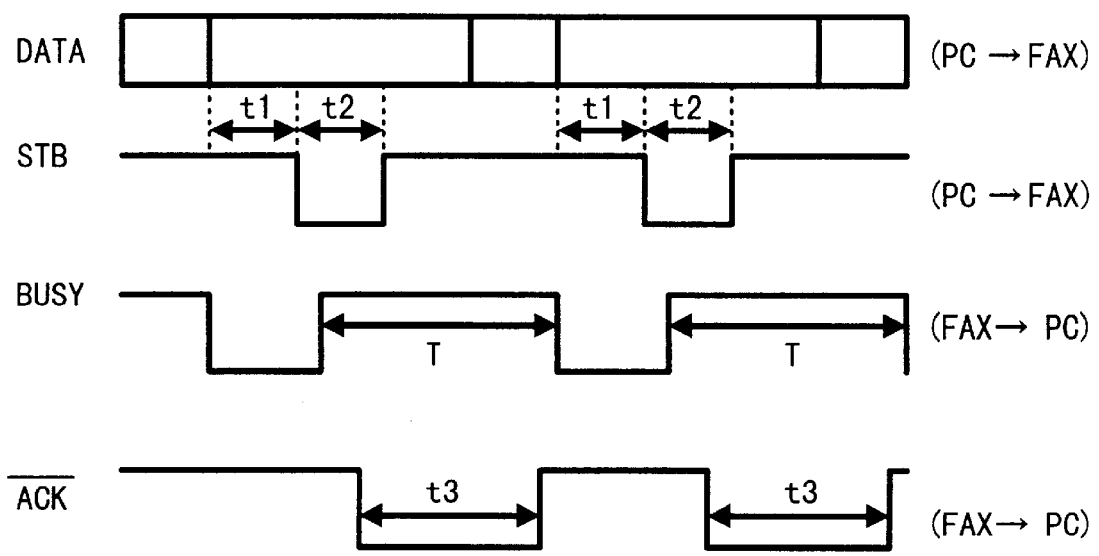
FIG. 3 is a timing chart showing how the input of print data is timed.

FIG. 3 is a timing chart showing how the input of print data from the personal computer 50 is timed. The personal computer 50 first outputs print data "DATA." Upon elapse of a time period t1, approximately 750 nsec, during which the output print data is set up, the busy signal "BUSY" output by the facsimile machine 1 may be at a Low level. If the busy signal is at a Low level, a strobe signal "STB" is held at a Low level for a time t2, approximately 750 nsec. At a trailing edge of the strobe signal "STB", the print data "DATA" is admitted to the input register 14A of the personal computer interface 14.

When the print data has been input to the input register 14A, the facsimile machine 1 outputs a High level busy signal "BUSY" to the personal computer 50 and simultaneously carries out the print data input interrupt handling control routine. The busy signal "BUSY" is held at a High level for the period of time set on the busy timer 14C. Thus, the duration time T for the High level busy signal "BUSY" is 9 $\mu$s when print priority mode is in effect or when no facsimile data is being received, and 400 $\mu$s when print priority mode is not selected and facsimile data is being received.

When the busy signal "BUSY" is High, a Low level acknowledge signal "ACK" is output for a predetermined time t3. Upon elapse of time t3, the acknowledge signal "ACK" is set to a High level. When the acknowledge signal "ACK" is set High, and upon elapse of the High level duration time T for the busy signal "BUSY", the busy signal "BUSY" is set to a Low level. This results in a wait state during which the facsimile machine 1 waits for print data "DATA" from the personal computer 50.

The manner in which the printer-function-equipped facsimile machine 1 of this invention receives and prints input print data will now be described with reference to the control routines shown in FIGS. 4–6.

FIG. 4 shows a control routine for establishing the High-level busy signal duration time T. The "BUSY TIME" control routine shown in FIG. 4 is carried out periodically by the CPU 11.

The routine starts at step S0 and proceeds to step S1, where the control system determines if print priority mode has been selected. If print priority mode has been selected, control jumps to step S4. Otherwise, control continues to step S2.

At step S2, the control system determines if facsimile data is being received. If facsimile data is not being received, control jumps to step S4. Otherwise, control continues to step S3, where the High level busy signal duration time T is set to 400 $\mu$s. Next, at step S5, the control routine ends.

At step S4, the control system sets the High level busy signal duration time T to 9 $\mu$s. Control then continues to step S5.

FIG. 5 shows a preferred control routine for handling a print data input interrupt. When the personal computer 50 sets the strobe signal "STB" to a Low level, print data is input to the input register 14A at a trailing edge of the STB signal. The input of print data causes the interrupt generation circuit 14B to interrupt the CPU 11. The CPU 11 then carries out interrupt handling.

The control routine starts at step S10 and proceeds to step S11, where the control system reads the print data from the input register 14A. Next, at step S12, the read print data is written to the print memory 13B. Control then continues to step S13, where the control routine ends.

The print data written to the print memory 13B is printed onto recording paper using the print data printing control routine shown in FIG. 6. The printing control routine is carried out periodically by the CPU 11.

The control routine starts at step S20 and proceeds to step S21, where the control system determines if one page of print data has been written to the print memory 13B. If one page of print data has not been written to print memory 13B, control jumps to step S23. Otherwise, control continues to step S22.

In step S22, the control system prints out the one page of print data with the printer 25. The printer 25 may be a laser beam printer, an ink jet printer, a thermal printer or similar printing apparatus known in the art. Control then continues to step S23, where the control routine ends.

As described above, the printer-function-equipped facsimile machine of this invention has the print data input time interval set for a short time period of preferably 9 $\mu$s when print priority mode is selected or when no facsimile data is being received. The shortened print data input time interval allows more print data to be input per unit time. This allows print data to be printed at high speeds. As long as print priority mode is in effect, facsimile data will not be printed, even if it has been received. When print priority mode is not selected and when no facsimile data is being received, residual facsimile data may be printed, but no process is performed for facsimile data reception. This means that the shortened print data input time interval does not adversely affect the process of receiving and printing facsimile data.

When print priority mode is not selected and when facsimile data is being received, a long print data input time interval, preferably 400 $\mu$s, is set. This allows more time to execute the process of receiving and printing facsimile data. As a result, facsimile data is received and printed at higher speeds.

As shown in the control routine of FIG. 4, the High level output "BUSY" signal duration time T is set short or long depending on whether or not print priority mode is selected. Varying the "BUSY" signal duration time T varies the print data input time interval. This feature can be implemented with a simple structure which adds little to the manufacturing costs and allows the time interval between print data inputs to be varied appropriately.

In the multi-function peripheral device according to the first aspect of the invention, the mode judgment means and the input interval setting means correspond to the CPU 11 performing steps S1 and S4, respectively, of the control routine shown in FIG. 4. In the preferred multi-function peripheral device of this invention, the reception judgment means and the input interval setting means correspond to the CPU 11 performing steps S2 and S3, respectively, of the control routine shown in FIG. 4.

As shown in FIG. 2, the control system for the multi-function peripheral device of this invention is preferably implemented using a programmed microprocessor or microcontroller and peripheral integrated circuit elements. However, the control system can also be implemented using an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flowcharts shown in FIGS. 4–6 can be used to implement the control system.

While this invention has been described in conjunction with the embodiments outlined above, it is evident that many alternatives, modifications and variations will be apparent to those skilled in the art. For example, in the above-described embodiments, the High level output "BUSY" signal duration time T is set to be long or short under software control. However, a long "BUSY" signal duration time T may be set under software control while a short "BUSY" signal duration time T is set under hardware control.

Furthermore, although the facsimile machine 1 is connected to the personal computer 50 via the Centronics®-type interface 14, other types of connections may be used. For example, the facsimile machine 1 may be connected to the personal computer 50 via an RS-232C interface.

Accordingly, the preferred embodiments of the invention as set forth above are intended to be illustrative, not limiting. Various changes may be made without departing from the spirit and scope of the invention as defined in the following claims.

What is claimed is:

1. A multi-function peripheral device, comprising:
    facsimile data reception means for receiving facsimile data inputs from a facsimile device;
    print data input means for receiving print data inputs from an external device;
    print priority mode selection means for selectively choosing a print priority mode;
    recording means for recording, onto a recording medium, data received by the facsimile data reception means and data received by the print data input means, the recording means printing the print data inputs before printing the facsimile data inputs when the print priority mode is selected; and
    input interval setting means for setting, when the print priority mode is selected, a time interval between print data inputs, received by the print data input means, that is shorter than a time interval set when the print priority mode is not selected and facsimile data is received.

2. The multi-function peripheral device of claim 1, wherein the input interval setting means sets a time interval between print data inputs to approximately 9 $\mu$s when the print priority mode is selected and to approximately 400 $\mu$s when the print priority mode is not selected and facsimile data is received.

3. The multi-function peripheral device of claim 1, further comprising mode judgment means for judging whether the print priority mode is selected, the input interval setting means setting the time interval based on a judgment made by the mode judgment means.

4. The multi-function peripheral device of claim 1, further comprising reception judgment means for judging whether the facsimile data reception means is receiving facsimile data, the input interval setting means setting, when the print priority mode is not selected and the reception judgment means judges that facsimile data is being received, a time interval between print data inputs that is longer than the time interval set when the print priority mode is selected.

5. The multi-function peripheral device of claim 4, wherein the input interval setting means sets the time interval to the shorter time interval when the print priority mode is not selected and the reception judgment means judges that facsimile data is not being received.

6. The multi-function peripheral device of claim 1, wherein the input interval setting means adjusts the time interval between print data inputs by adjusting a time interval between busy signals output to the external device.

7. A multi-function peripheral device, comprising:
    facsimile data reception means for receiving facsimile data inputs from a facsimile device;
    print data input means for receiving print data inputs from an external device;
    print priority mode selection means for selectively choosing a print priority mode;
    recording means for recording, onto a recording medium, data received by the facsimile data reception means and data received by the print data input means, recording means recording print data before printing facsimile data when the print priority mode is chosen by the print priority mode selection means; and
    input interval setting means for setting, when facsimile data is being received while the print priority mode is not chosen, a time interval between print data inputs received by the print data input means that is longer than a time interval set when facsimile data is not being received while the print priority mode is not chosen.

8. The multi-function peripheral device of claim 7, wherein the input interval setting means sets a time interval between print data inputs to approximately 9 $\mu$s when facsimile data inputs are not being received and to approximately 400 $\mu$s when facsimile data inputs are being received.

9. The multi-function peripheral device of claim 7, further comprising reception judgment means for judging whether the facsimile data reception means is receiving facsimile data inputs, the input interval setting means setting the time interval based on a judgment made by the reception judgment means.

10. The multi-function peripheral device of claim 7, wherein the input interval setting means adjusts the time interval between print data inputs by adjusting a time interval between busy signals output to the external device.

11. A method of using a multi-function peripheral device to record facsimile data and print data supplied from external devices, comprising:
    determining whether a print priority mode of the peripheral device is selected;
    setting, when a print priority mode is selected, a time interval between receiving print data inputs that is shorter than a time interval set when the print priority mode is not selected and facsimile data is received; and
    recording, onto a recording medium, the print data inputs before recording facsimile data inputs, when the print priority mode is selected.

12. The method of claim 11, wherein a time interval between receiving print data inputs is set to approximately 9 $\mu$s when the print priority mode is selected and to approximately 400 $\mu$s when the print priority mode is not selected and facsimile data is received.

13. The method of claim 11, further comprising setting, when the print priority mode is not selected and facsimile data inputs are being received, a time interval between print data inputs that is longer then the time interval set when the print priority mode is selected.

14. The method of claim 13, wherein a time interval between print data inputs is set to approximately 400 $\mu$s when the print priority mode is not set and facsimile data inputs are being received and to approximately 9 $\mu$s when facsimile data inputs are not being received.

15. The method of claim 11, wherein the time interval between print data inputs is adjusted by adjusting a time interval between busy signals output to an external device from which the print data inputs are received.

16. A method of using a multi-function peripheral device to record facsimile data and print data inputs from external devices, comprising:
   determining if facsimile data inputs are being received;
   selectively choosing a print priority mode;
   determining if the print priority mode has not been chosen;
   setting, when the facsimile data inputs are being received while the print priority mode is not chosen, a time interval between print data inputs that is longer than a time interval set when facsimile data inputs are not being received while the print priority mode is not chosen; and
   recording onto a recording medium, the print data and the facsimile data.

17. The method of claim 16, wherein a time interval between print data inputs is set to approximately 9 $\mu$s when facsimile data inputs are not being received and to approximately 400 $\mu$s when facsimile data inputs are being received.

18. The method of claim 16, wherein the time interval between print data inputs is adjusted by adjusting a time interval between busy signals output to an external device from which the print data inputs are received.

19. A storage medium that stores a control program for use in controlling a multi-function peripheral device that receives and prints facsimile data and print data supplied from external devices, the control program including instructions to:
   determine whether a print priority mode of the peripheral device is selected;
   set, when a print priority mode is selected, a time interval between receiving print data inputs that is shorter than a time interval set when the print priority mode is not selected; and
   record, onto a recording medium, the print data inputs before recording facsimile data inputs, when the print priority mode is selected.

20. The storage medium of claim 19, wherein the instructions are to set the time interval between receiving print data inputs to approximately 9 $\mu$s when the print priority mode is selected and to approximately 400 $\mu$s when the print priority mode is not selected.

21. The storage medium of claim 19, the control program further comprising instructions to set, when the print priority mode is not selected and facsimile data inputs are being received, a time interval between print data inputs that is longer than the time interval set when the print priority mode is selected.

22. The storage medium of claim 21, wherein the instructions are to set the time interval between the print data inputs to approximately 400 $\mu$s when the print priority mode is not set and facsimile data inputs are being received and to approximately 9 $\mu$s when facsimile data inputs are not being received.

23. The storage medium of claim 19, wherein the instructions adjust the time interval between print data inputs by adjusting a time interval between busy signals output to the external device.

24. A storage medium that stores a control program for use in controlling a multi-function peripheral device that receives and prints facsimile data and print data inputs from external devices, the control program including instructions to:
   determine if facsimile data inputs are being received;
   selectively choose a print priority mode;
   determining if the print priority mode has not been chosen;
   set, when the facsimile data inputs are being received while the print priority mode is not chosen, a time interval between print data inputs that is longer than a time interval set when facsimile data inputs are not being received while the print priority mode is not chosen; and
   record, onto a recording medium, the print data and the facsimile data.

25. The storage medium of claim 24, wherein the instructions are to set the time interval between print data inputs to approximately 9 $\mu$s when facsimile data inputs are not being received and to approximately 400 $\mu$s when facsimile data inputs are being received.

26. The storage medium of claim 24, wherein the instructions adjust the time interval between print data inputs by adjusting a time interval between busy signals output to the external device.

27. A multi-function peripheral device, comprising:
   facsimile data reception means for receiving facsimile data from a facsimile device;
   print data reception means for receiving print data from an external device, print data reception means having an input register temporarily storing print data from the external device;
   print priority mode selection means for selectively choosing a print priority mode;
   recording means for recording, onto a medium, data received by the facsimile data reception means and data received by the print data reception means, the recording means printing the print data before printing the facsimile data when the print priority mode is selected; and
   input interval setting means for setting a time interval so as to prevent the input register from storing print data from the external device until the predetermined time has been elapsed even when the input register is empty under a predetermined condition wherein the predetermined condition includes that the facsimile data reception means receives facsimile data from the facsimile device when the print priority mode is not selected.

* * * * *